Nigel Allister Anstey
INVENTOR

BY Mason, Kolehmainen, Rathburn + Wyss
ATTORNEYS

Nigel Allister Anstey
INVENTOR

BY
Mason, Kolehmainen, Rathburn & Wyss ATTORNEYS

Nigel Allister Anstey
INVENTOR

BY

Mason, Kolehmainen, Rathburn + Wyss ATTORNEYS

United States Patent Office 3,286,228

Patented Nov. 15, 1966

3,286,228

METHOD OF TRANSMITTING AND RECEIVING SIGNALS IN SEPARATE FREQUENCY PARTS TO REDUCE UNDESIRED COMPONENTS

Nigel Allister Anstey, Chelsfield, Kent, England, assignor to Seismograph Service Corporation, Tulsa, Okla.

Filed Jan. 17, 1963, Ser. No. 252,175
Claims priority, application Great Britain, Jan. 19, 1962, 2,027/62
21 Claims. (Cl. 340—15.5)

This invention relates to methods of and systems or apparatus for obtaining information about a medium through which signals can be transmitted and it is especially applicable to, although not limited to, seismic work in which the medium is provided by the earth's crust. The invention is especially applicable to and will be more fully described as applied to echo ranging, for example in seismic exploration.

It is one of the objects of the present invention to provide a method of obtaining information about a transmission medium utilising a wave motion which is transmitted through the medium and which has a frequency bandwidth which is substantial relative to its central frequency.

A further object of the invention is to provide such a method which comprises dividing the total bandwidth of said wave motion into a plurality of parts, subjecting each such part of said wave motion to a control action which is sensitive to frequency and has at least one characteristic selected to suit the restricted frequency range of said part, and recombining the several parts after said control action thereon, to obtain an output from which required information can be obtained.

Another object of the invention is to provide a novel or improved method of obtaining information about a transmission medium utilising signals which are transmitted into the medium and which are received after travel through the medium, which method may, according to the invention comprise generating a signal of extended bandwidth and transmitting it into said medium, receiving said signal after transmission through said medium using a receiving array having a number of sections each of which is frequency sensitive and combining the outputs from said sections with modification of some at least of said outputs in accordance with the relation between the frequency-sensitivity of the section concerned and the central frequency of said extended bandwidth.

A still further object of the present invention is to provide a system for obtaining information about a transmission medium, which system may, according to this invention, include signal receiving means comprising a plurality of strings of receiver units, each string including a plurality of spaced units having a common output connection, control means for introducing proportional changes in the effective amplitudes of signals from the different strings, said changes being different for different strings according to the positions of the latter and the spacing of the receiver units in said strings, said control means being adjustable so as both to select different numbers of said strings and also to control the proportional amplitudes of signals from such strings, means being provided for combining, amplifying and recording the resulting signals.

Yet another object of the invention is to provide improvements in apparatus, including parts of such apparatus, which is intended for use in carrying out the methods of the invention and for inclusion in systems exemplifying the invention, while the invention is also concerned with methods of designing and calculating details of such systems and apparatus, including the methods of use and working of such systems and apparatus.

For the better understanding of the invention reference will be made to the accompanying drawings, in which.

Figure 1:
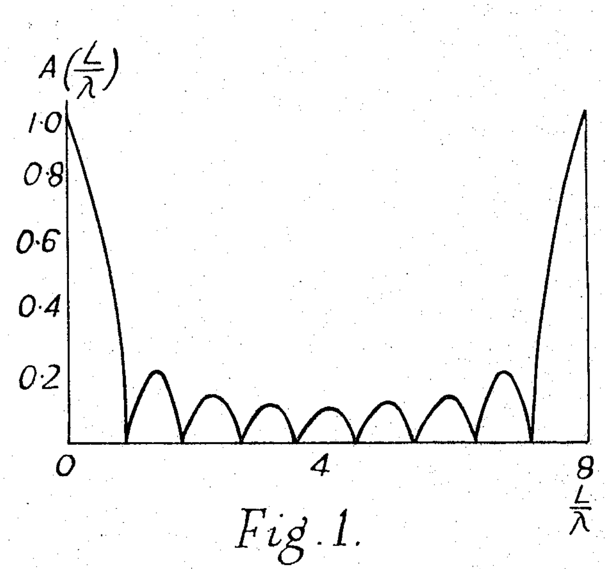
FIGURE 1 is a diagram which shows graphically the response of a linear pattern of geophones to a received signal.

As will appear from the following description the invention is concerned especially with the directional reception of waves, particularly in pulse-compressive, frequency-modulated, continuous-wave or pulsed-continuous-wave echo-ranging systems. It will be more particularly described in terms of the "Vibroseis" method of seismic reflection exploration, although the technique which will be described is not restricted to this method and the invention is capable of other applications; it is not limited to seismic work.

The "Vibroseis" system is particularly described in United States patent specifications Nos. 2,688,124, 2,808,577, 2,874,795, 2,910,134 and 2,981,928. In this system, vibrators on the surface of the ground inject into the earth a long non-repetitive signal, and information on the travel paths between the vibrator and a detecting station is obtained by cross-correlating the detected signal with the original transmitted signal.

In the first three of the above-mentioned echo-ranging methods, i.e. in the pulse-compressive, frequency-modulated and continuous-wave methods, it is desirable or necessary to use a long signal (i.e. a signal of a duration which is comparable to or longer than the travel times of interest). Therefore, early echoes will be received at the detector while the transmitter is still radiating, and so will be superimposed on the direct or reflected arrivals from the transmitter to detector. The undesired direct or refracted arrivals will normally be of very much greater amplitude than the desired reflected signals, and the latter may be effectively masked. One manner of overcoming this difficulty is described in the above-mentioned United States patent specifications (particularly Nos. 2,874,795 and 2,981,928); it involves an array of detectors and/or sources distributed in a dimension which allows the array to have great sensitivity in directions corresponding to reflected arrivals but small sensitivity in directions corresponding to direct arrivals. This is particularly valuable for those echo-ranging methods which involve low frequencies and/or high velocities, in which cases it is difficult in practice to obtain a highly directional emission from the transmitter.

The manner of computing the response of an array of detectors is well known in the arts of antenna design and seismic exploration. In the terminology of seismic exploration, the response $A(L/\lambda)$ of a linear pattern of length L (composed of $n$ geophones of equal sensitivity) to a sinusoidal signal of apparent wave length $\lambda$ is given by $$A\left(\frac{L}{\lambda}\right)=\left|\frac{\sin \pi \frac{nL}{(n-1)\lambda}}{n \sin \pi \frac{L}{(n-1)\lambda}}\right|$$

In the above equation the term $A(L/\lambda)$ denotes the output response of the geophones pattern as a function of $L/\lambda$. This response is illustrated for $n=9$ in FIGURE 1 of the accompanying drawings, in which $A(L/\lambda)$ is plotted against $L/\lambda$. If the pattern is continuous (i.e. $n$ is infinite) the response becomes:

$$A\left(\frac{L}{\lambda}\right)=\left|\frac{\sin \frac{\pi L}{\lambda}}{\frac{\pi L}{\lambda}}\right|.$$

Figure 2:
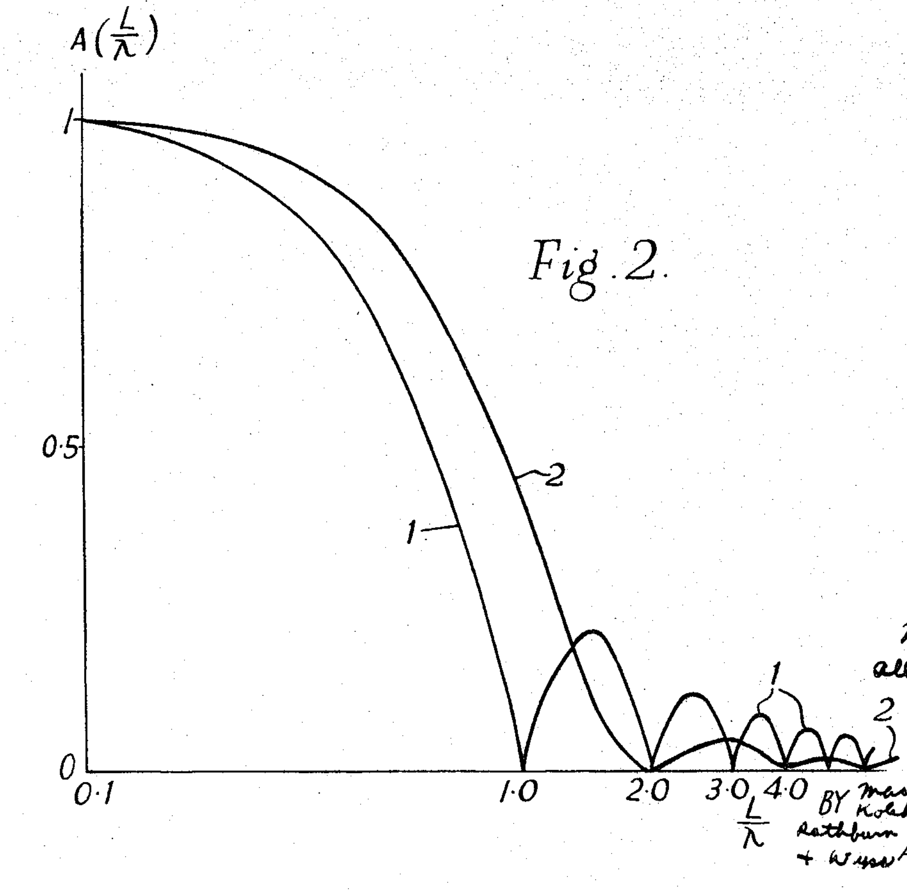
FIGURE 2 is another diagram showing the responses for particular signal and geophone combinations.

This response is illustrated (on a logarithmic $L/\lambda$ scale) as curve 1 in FIGURE 2 of the accompanying drawings.

The height of the subsidiary peaks in the response may be reduced (relative to the $\lambda=\infty$ case) by "grading" (or "weighting" or "tapering") the response of the detectors as a function of position in the pattern. For instance, a case in which the sensitivity of the detectors decreases as a linear function of the distance from the centre of the pattern (being unity at the centre and zero at the ends) produces the curve 2 of FIGURE 2.

The main consideration dictating a pattern is, clearly, that of ensuring that the reflected signal (for which the apparent velocity across the pattern is high) is admitted with near-maximum response, while the direct signal (for which the apparent velocity across the pattern is the actual near-surface wave velocity) falls in a null of the response. Unfortunately, for a particular pattern length, a particular wave velocity and a particular configuration of source, reflector and detecting patterns, a true null can be obtained only for discrete frequencies; this is evident from FIGURES 1 and 2.

Now the characteristics of the earth are such that seismic exploration can usually employ a bandwidth of one and a half or two octaves, and sometimes more. In the case where the "Vibroseis" method uses a transmitted signal having this bandwidth, there exists a difficulty in deciding the optimum compromise for the pattern length. Often the compromise adopted involves an undesirably high level of the direct arrival at the low frequencies and an undesired attenuation of the reflected arrival (particulary from shallow depths) at the high frequencies.

To overcome this difficulty we propose to establish the desired bandwidth by a series of observations, each of restricted bandwidth, and by the subsequent addition of these observations in appropriate manner. In exploration using continuous or quasi-continuous sine waves this can be done directly; in pulse-compressive systems, such as the "Vibroseis" method, it can be done by dividing the frequency sweep into several sub-sweeps. Thus, as an example 40 sweeps from 20 to 80 c.p.s. (i.e., 2 octaves) might be replaced by 10 sweeps from 20 to 35 c.p.s. added to 10 sweeps from 35 to 50 c.p.s. added to 10 sweeps from 50 to 65 c.p.s. added to 10 sweeps from 65 to 80 c.p.s. Then an appropriate pattern length may be selected in order to maximise in turn the ratio of reflected to direct information over each of the narrower bandwidths involved.

It is therefore one of the features of the present invention that it makes it possible to achieve such variation in geophone pattern lengths in a practical manner.

The invention is further concerned with "mixing," or the representation on one final trace of information which has been obtained from more than one detecting location. Various methods of doing this are possible in seismic exploration; it may be done by controlled electrical cross-feed between the amplifiers associated with neighbouring channels of information, while it is done automatically whenever there is overlap between the geophone patterns associated with neighbouring channels. This latter case is sometimes termed "ground mixing."

In the past, the use of mixing has been somewhat controversial. Two main arguments can be raised against it.

The first argument concerns the filtering effect of mixing. Because of dip of the reflecting strata and/or the geometry of the source-reflector-detector configuration, time differences must sometimes exist between reflections on adjacent channels. If mixing is used, then there is a risk that cancellation of the reflections may occur at these parts of the record where considerable time differences exist, or that, at least, the significance of these time differences may be obscured. This effect is clearly more serious at the high frequencies than at the low, and indeed may be viewed as a filter of a type similar to that discussed above in connection with geophone patterns.

It is, therefore, one of the objects of the present invention to provide mixing of a degree which is related to frequencies, being considerable (and quite safe) at low frequencies but small or non-existent at high frequencies. It is to be noted that this also overcomes much of the difficulty associated with large geophone patterns or high degrees of electrical mixing in areas of considerable local elevation or "weathering" differences.

The second argument against mixing invokes the fact that there is a greater assurance of the validity of a reflection if it is observed on several completely independent channels, i.e. if several small samples of the reflected wavefront are the same. If, however, a high level of some disturbing noise masks what is otherwise a seismically adequate reflection, then a small sample is not adequate and a larger sample must be taken. In some areas this increased sampling necessitates the use of rectangular, start or similar patterns, extending laterally of the line of profile. In other areas with different noise problems it may be adequate and desirable to increase the sampling in the line of profile, which is tantamount to increasing the ground mixing. It is a further advantage of the present invention that it allows a smooth control of the degree of ground mixing, so that this degree may be held, if desired, to the minimum value necessary to obtain adequate reflection information, and that this degree may readily be changed as local reflection quality improves or degrades.

The present invention will first be described in terms of the quasi-continuous sine-wave method of exploration, and then adapted to the "Vibroseis" method.

The former method involves the sequential injection into the transmitting medium of many sinusoidal signals, of frequencies separated by an amount $\delta f$ c.p.s. ($\delta f \leq 1/T$ where T sec. is the greatest echo time of interest) and having a known time-phase relation. The signals detected after refraction and/or reflection in the transmitting medium, and corresponding to each of the many sinusoidal signals injected, may then be added in appropriate time-phase relation to synthesis reflection pulses similar to those occuring with an impulse echo-ranging method. This is a straight-forward application of Fourier synthesis.

Very considerable echo-ranges may be obtained with modest input powers if the returned echoes are sharply filtered at the appropriate frequency (for example, by cross-correlation techniques, possibly using a ring-type or other modulator or the correlator which is described in our British patent application No. 16,687/61 or in United States application Serial No. 190,912, filed by Nigel A. Anstey and William E. Lerwill on April 30, 1962.

For seismic exploration the discrete frequencies which should be used generally lie in the range 10–100 c.p.s. and the duration of each signal is of the order of seconds, so that each signal has a very small bandwidth. One object in arranging the geophone patterns is therefore to ensure that the value of the apparent wavelength of the most troublesome direct or refracted arrival represents a null in the pattern response. This is usually the first null, and consideration of curve 1 of FIGURE 2 shows that the null is suitably sharp.

One possible method of operating would involve laying out the geophone pattern appropriate to the highest frequency to be used, injecting this frequency into the earth and making a recording, re-laying the geophone pattern for the second (lower) frequency and injecting this, re-laying the geophone pattern for the third frequency and injecting this, and so on. Since for seismic exploration several hundred discrete frequencies are desirable, and since the re-laying of geophone patterns is a tedious and time-consuming task, this method is impractical.

A second method involves the use of tapered patterns. Consideration of a curve 2 of FIGURE 2 shows that here the null can be made considerably broader by suitable choice of the tapering function. Then several or many discrete frequencies may be injected (across the width of this null) before the pattern need be re-laid.

A third method involves the laying of each pattern in sections, such that the basic section represents the pattern length for the highest frequency and such that additional sections may be brought into use as greater length is required for the lower frequencies. If the necessity to make manual electrical connections on the spread is to be avoided, it is necessary to provide remotely-controlled switching at the geophone pattern or an unusually high number of conductors in the cable linking the recording truck to the geophone spread. Because of these complications, this method is not attractive in normal or "in-line" operation, in which the signal from one source position is detected by a plurality of receiving positions. However, it is entirely feasible for "transposed" operation, in which the signals from a plurality of source positions are detected at one or two receiving positions. As above the number of changes which must be made over the gamut of frequencies may be reduced by using a tapering system which gives a wider null.

A fourth method, which represents a preferred form of the invention, will now be described in more detail.

Figure 3:
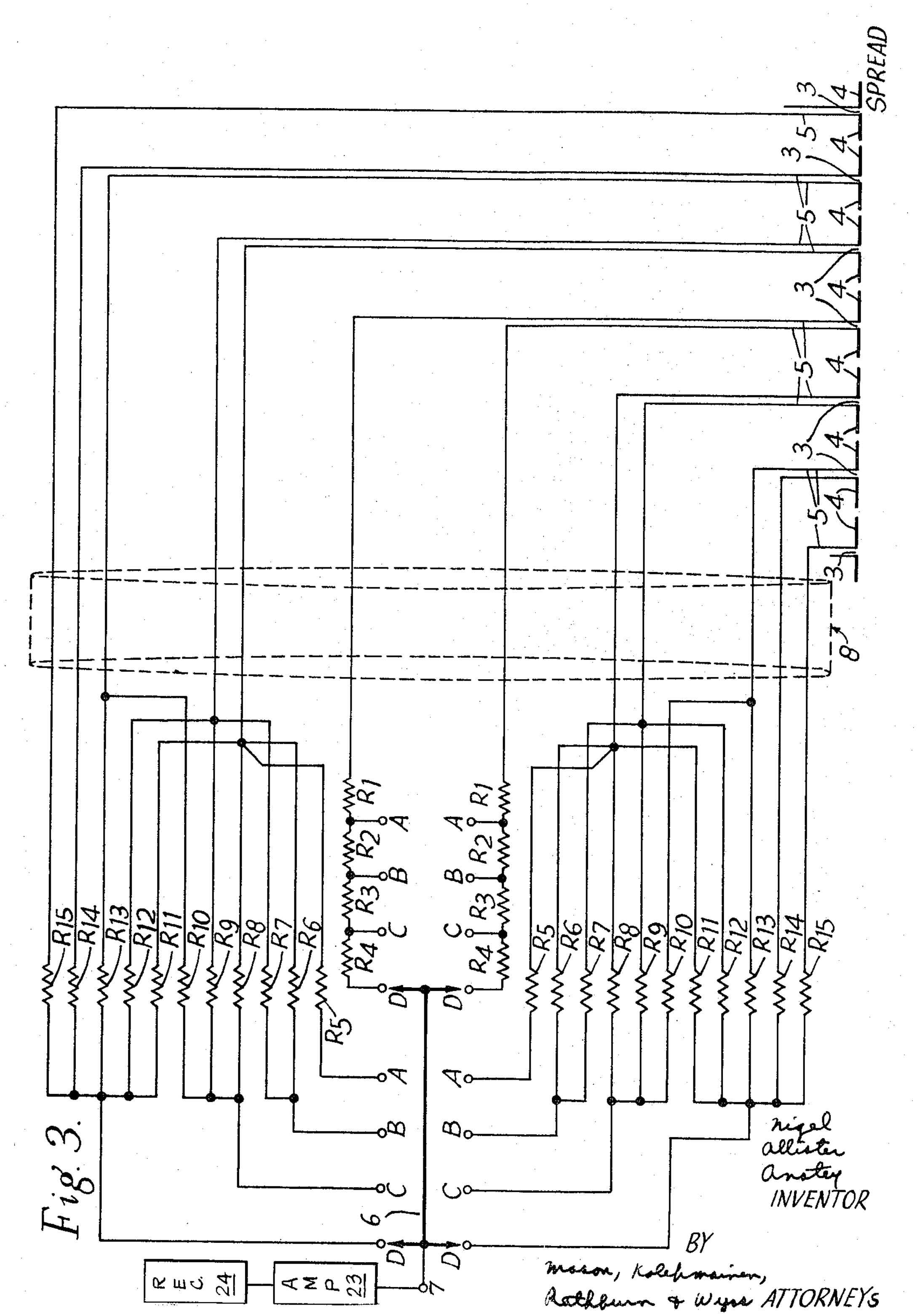
FIGURE 3 is a diagrammatic view showing part of a seismic system and apparatus which exemplify the present invention.

FIGURE 3 of the accompanying drawing represents the arrangement appropriate to each channel of information; it considers a fairly difficult case as an example. The distance between geophone stations is taken as 132 ft., the velocity of the direct or refracted arrival is taken as 10,000 ft./sec., and the total frequency range of 20–80 c.p.s. is divided into four sub-ranges D, C, B and A. Points labelled 3 in FIGURE 3 represent geophone stations 132 ft. apart; the cable "take-outs" coincide with these points. At each take-out are attached two strings 4, each of perhaps five geophones extending over nearly 66 ft. in opposite directions, which are so disposed that there is an even distribution of geophones all along the spread. The "low" side of both strings may be common, in which case it is returned along one line (not shown) in the geophone cable 8; the "high" sides 5 are brought to the recording station separately. A 4-pole, 4-position selector switch 6 selects conditions appropriate to each of the four sub-ranges A, B, C and D. The effective geophone output signal appears at terminal 7, between this terminal and the aforesaid "low" line, whence it is applied to the input of the recording amplifier 23 and from there to a recorder 24, which amplifier and recorder may be of any suitable types such as are well known in seismic work.

With the sub-range selector switch 6 in position A, the output appearing at the terminal 7 includes an equal contribution from the two central geophone strings through resistors $R_1$ and a lesser contribution from the adjacent strings through resistors $R_5$. In position B the contribution from the central strings comes through resistors $R_1$ and $R_2$ in series, while graded contributions are added from the adjacent two strings, each side, through resistors $R_6$ and $R_7$. In positions C and D graded contributions are included from progressively more geophone strings, through resistors $R_8$ to $R_{15}$ inclusive.

The grading action of the resistors, of course, necessitates a load resistor (not shown), which can conveniently be the input resistance of the recording amplifier.

Figure 4:
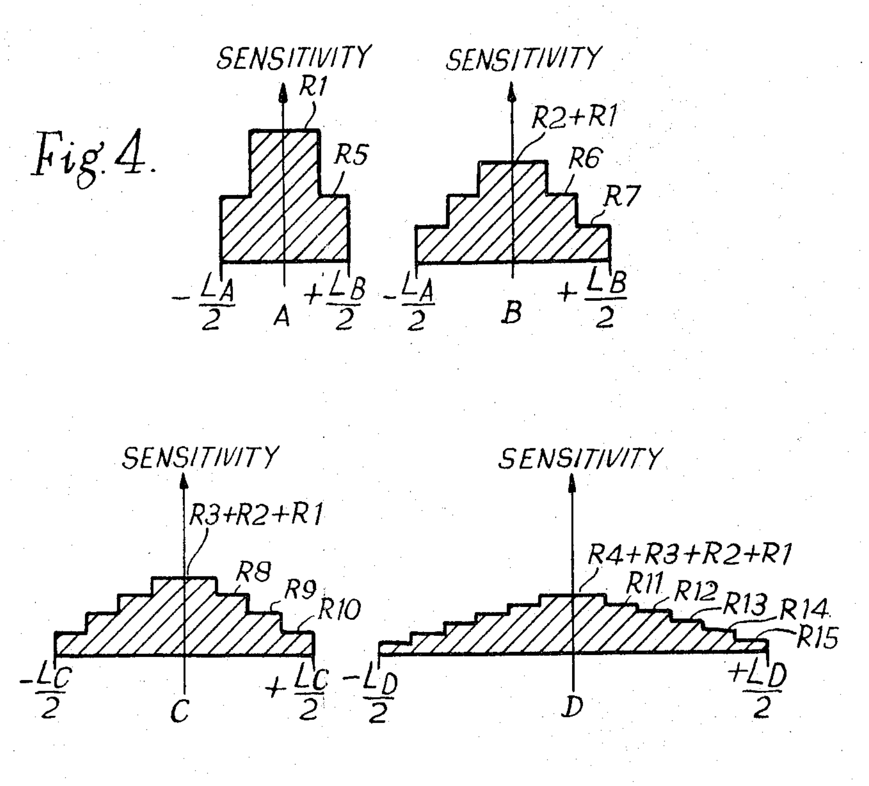
FIGURE 4 is a diagram in four parts which illustrates one method of calculating values for parts of the apparatus shown in FIGURE 3.

FIGURE 4 illustrates one grading or tapering scheme which may be used to determine the values of the resistors $R_1$ to $R_{15}$. In each of the four diagrams A, B, C and D (corresponding to the four sub-ranges or switch positions of the switch 6 of FIGURE 3) the effective sensitivity of each geophone string is plotted against its position relative to the centre of the pattern. In the case shown the sensitivity falls in uniform steps away from the centre, and the resistance values are also adjusted so that the effective output of the pattern corresponding to a vertically-arriving reflection is constant (i.e., the shaded areas are equal).

The response curves corresponding to FIGURES 1 and 2 can be plotted for this grading scheme from the relation:

$$A\left(\frac{L}{\lambda}\right)n=\frac{\lambda}{n\pi\lambda}\left[\sin\frac{\pi L}{\lambda}+\sin\frac{n-1}{n}\cdot\frac{\pi L}{\lambda}+\sin+\frac{n-2}{n}\cdot\frac{\pi L}{\lambda}+\ .\ .\ .\ +\sin\frac{1}{n}\cdot\frac{\pi L}{\lambda}\right]$$

where $n$ is the number of sensitivity levels (e.g., 3 for case B) and L is the total pattern length. From these curves it can be shown that in the present example the rejection of the horizontally-arriving interference is better than 50:1, for all frequencies, if the total frequency range from 20–80 c.p.s. is divided into the four half-octave ranges 20–28, 28–40, 40–57, and 57–80 c.p.s. The figure of 50:1 applies at the edge of each sub-range; in the central portion, of course, the rejection is virtually complete.

The case quoted above is intended as an example only. It illustrates that very good rejection can be obtained when a normal frequency range is divided into only four parts, and this represents a desirable field feature. If greater rejection is required (for instance, when the transmitter is unusually close to the spread of detectors, the number of parts can be increased, but four is a good working figure.

In the example quoted the horizontal velocity of 10,000 ft./sec. is unusually high; this is a serious case and the overall pattern dimensions range from 264 feet for the high frequencies to 792 feet for the low. More normal horizontal velocities are in the range 3000–7000 ft./sec., for which the pattern dimensions would be proportionally less. At very low horizontal velocities, therefore, or for high maximum frequencies, the smallest pattern length may be reduced to just one 66 ft. string of geophones. This means that no grading or tapering will be available, so that the null of the pattern response will be sharp; the technique then is to reduce the bandwidth of sub-range A and to increase as necessary those of lower ranges (for which the use of grading yields a wider null).

The grading function described in the above case is also purely exemplary; it is within the scope of the invention to use any function which permits a suitable interrelation of sub-range frequencies, observed horizontal velocities, geophone intervals and required rejection levels. Furthermore it is sometimes convenient to adopt different grading functions for the different sub-ranges (for instance, when the pattern length calculated for a first grading function is not adequately close to an integral multiple of half the geophone interval).

The above technique can now be translated into the terms of the "Vibroseis" method very simply. Basically, instead of the division of the total range of discrete frequencies into several sub-ranges, it is merely necessary to divide the normal sweep of frequencies into several stricttly-consecutive sub-sweeps. The division of a 2-octave sweep into four half-octave sub-sweeps gives a weighting to the low frequencies which may not be desired, and so a linear division of the frequency range may be used. This means that in the example quoted above the rejection ratio is better than 100:1 for the highest sub-sweep, but it decreases to the order of 25:1 for the lowest. These figures still represent a very considerable improvement over the prior art. The fact that a linear division means a smaller bandwidth for the highest sub-sweep is an advantage when, as mentioned above, conditions require that a single geophone string, without grading, shall represent the smallest pattern.

It is also possible to preserve a sweep sub-division in terms of octaves, while preserving an equal contribution from all frequencies. As an example the sweep from 20 to 80 c.p.s. can be divided into four sub-sweeps of 20 to 30, 30 to 40, 40 to 60 and 60 to 80 c.p.s. Each of these is approximately half an octave so that the rejection ratio is constant and is typically 50:1. To maintain equal contributions from all frequencies it is then necessary to inject two of the 40 to 60 and 60 to 80 c.p.s. sweeps and one of the 20 to 30 and 30 to 40 c.p.s. sweeps (or multiples in this ratio); in this way each 10 c.p.s. frequency range receives the same sweeping time.

So far, the discussion of the fourth method has been confined to one recording channel, and, in the severe case quoted, seven double take-outs, nineteen cable conductors and twelve strings of geophones are required to supply the signal for one channel. In the event that ten such channels are required for one spread, these facilities must be increased ten-fold. This method is therefore very cumbersome in practice, although it could be used in some circumstances.

This fourth method can be modified to reduce the required number of wires and geophones; this modification results in a further preferred form of the invention, which will be termed the fifth method. This method involves the distribution of the output of each geophone string so that it contributes to several channels of information, the amount of the contribution being dictated by the grading function.

Figure 5:
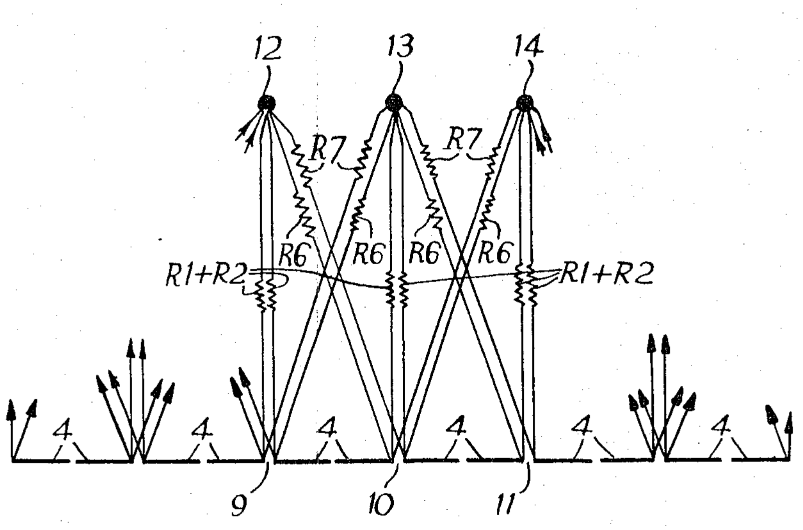
FIGURE 5 is a diagrammatic view showing in part a modified application of the system and apparatus shown in FIGURE 3.

In FIGURE 5 of the accompanying drawings the electrical connections for several signal channels are shown for the B condition, as an example. The arrangement of geophone strings 4 at take-outs, here indicated at 9, 10 and 11, each feeding through resistors $R_1$ and $R_2$, $R_6$ and $R_7$ to an amplifier input terminal, three of which are indicated at 12, 13 and 14, is shown complete for one channel, to the terminal 13, and in part for adjacent channels to terminals 12 and 14. This system means that:

(i) Three cable-conductors only are required from each take-out.

(ii) Except for the ends of the spread, one take-out only is required for each channel of information; in the severe case illustrated in FIGURES 3 and 4, a total of 16 take-outs and a total of 46 cable-conductors are required for 10 channels of information. These figures are reasonable in practice.

(iii) A contribution from the geophone strings at take-out 9 will appear in the output from terminal 14. This can be computed using likely values of geophone and cable resistance and values calculated for $R_1$, $R_2$, $R_6$ and $R_7$ on the basis of an assumed amplifier input resistance; this contribution is typically 5% and its effect on the grading scheme may thus be ignored. Contributions from geophone strings further away are quite negligible.

The resistor networks which are shown in FIGURES 3 and 5 are given for the sake of example. The same degree of controlled cross-feed may be obtained by other arrangements of resistive components.

It will thus be seen that the invention provides a system in which the frequency range to be used in an echo-ranging method is divided into a plurality of sub-ranges, and advantage is taken of the small bandwidth so obtained to improve the directional rejection offered by a pattern of spaced detectors. Five possible methods of realising the necessary patterns are quoted as examples; these examples culminate in arrangements such as those described with reference to FIGURE 5. Such arrangements yield the following features or advantages:

(1) Excellent rejection of signals crossing the pattern at a particular apparent velocity.

(2) This rejection is available over a bandwidth approaching half an octave, so that the total frequency range need be divided into reasonably few parts.

(3) If even better rejection is required, this can be obtained by increasing the number of parts.

(4) In the prior art it has been necessary to use a pattern of detectors and a pattern of sources (thus cascading the response of the pattern) in order to achieve adequate rejection. The rejection available with the method herein described is such that the use of a source pattern becomes unnecessary in some areas and under some circumstances; this is an operational advantage.

(5) With the system herein described there is no systematic loss of the high frequencies of the *reflected* signal.

(6) Ground mixing is provided in a manner which is believed to be completely novel; the degree of mixing may be made considerable at the low frequencies (where it cannot produce any harmful effects) but small or non-existent at the high frequencies.

(7) In the prior art a comprise pattern length is adopted, and this is sometimes sufficient to include appreciable elevation or weathering differences. The time shifts introduced by such differences may be harmful at the high frequencies but of little importance at the low frequencies. Therefore the system herein described, which uses a longer pattern for the low frequencies but a shorter pattern for the high frequencies, is less subject to elevation and weathering effects.

(8) The equipment requirements are small. In the example quoted, only 150 geophones are needed for a 10-channel spread. The cable requirements are unusual but entirely practical. By the simple switching of inexpensive resistor networks, a selection may be made of:

(a) The number of sub-ranges in the total frequency range, and (b) The apparent velocity of the interfering arrival.

The strings of geophones are much shorter, and hence less unwieldy than is usual. They are connected at one end only; the strings do not overlap, and the risk of incorrect connection can be effectively eliminated.

(9) It may be argued against the fifth and most preferred method that the reflection waveform ever reach 66 ft. length of profile is sampled by one geophone string only, and that this sample then contributes to several channels of information; it might be considered preferable to preserve several independent samples, as in the fourth method. Against this it can be said that the fifth method uses only 150 geophones to obtain its samples, and that the extra geophones necessary to obtain *independent* samples would be better used in obtaining *better* samples. Thus in an area where this sampling feature is important, the fifth method can provide better samples by replacing each single geophone string with several parallel strings, spaced apart laterally and having a common electrical connection.

(10) The method described preserves the general advantage of a tapered pattern; that is the subsidiary peaks in the response are reduced, relative to an untapered pattern. This feature is of value when there exist several velocities at which undesired signals are crossing the pattern; then, in the present case, the apparent-velocity control is set for the highest velocity at which serious interference exists.

The division of the total frequency range into several smaller ranges has, of course, several distinct advantages other than those associated with geophone patterns. In particular, considerable importance attaches to the facility of resonating the vibrator-ground coupling within each small range in turn, by the addition of supplementary mass or compliance.

Figure 6:
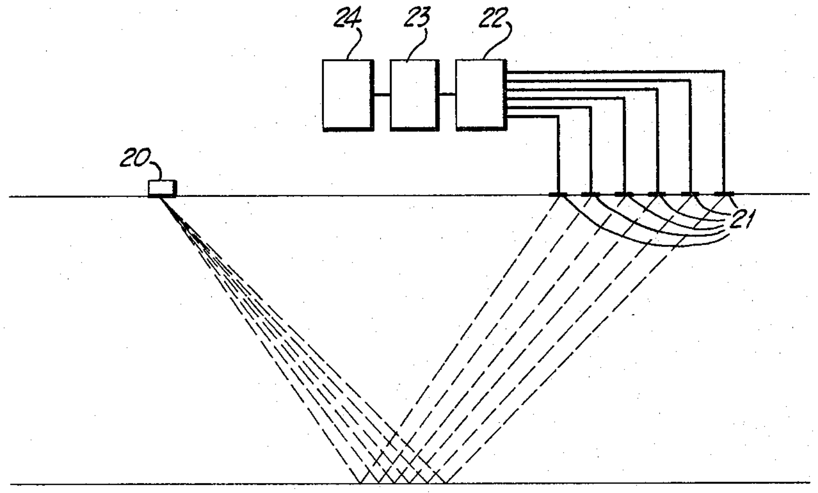
FIG. 6 is a diagrammatic view showing a single transmitter for passing a swept frequency signal through a portion of the earth's crust to an array of geophones spaced from the transmitter.
Figure 7:
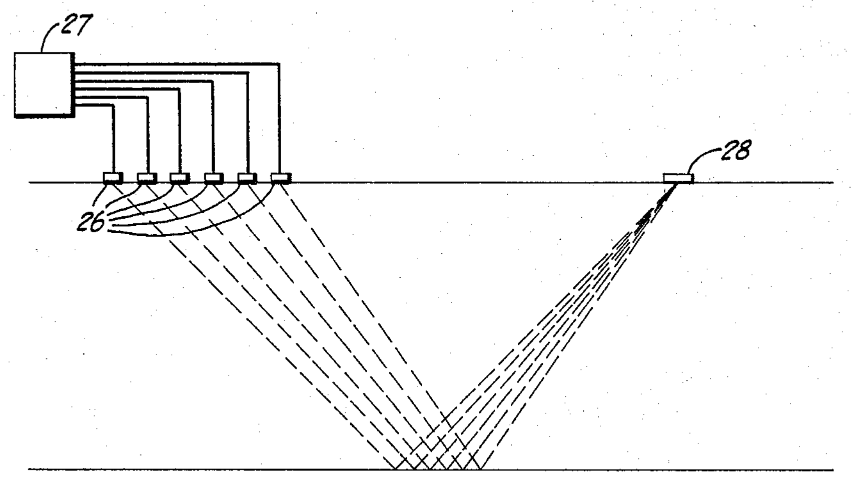
FIG. 7 is a diagrammatic view showing a pattern of transmitters for supplying graded and subdivided signals through the earth's crust to a single detector spaced from the transmitters.

As has been stated, the division of the bandwidth into parts and the frequency-sensitive control action on these parts may be effected when the signals are transmitted, instead of when they are received. This may be done, for example, by using for transmission an array of transmitting transducers which are arranged in a manner analogous to that which has been described for receiving transducers, means being provided for controlling the number of such transducers which are in operation and the relative amplitudes of the signals which they transmit. Thus, referring to FIG. 6 a single transmitter 20 is there shown for transmitting seismic signals to a pattern of geophones 21, which correspond to those shown in FIG. 3 and which supply the received signals through a switched resistance bank 22, whence they are fed through the amplifier 23 to the recorder 24. The seismic signals developed by the transmitter 20 are preferably of the swept frequency type referred to above. FIG. 7, on the other hand, shows a pattern of transmitters 26 which are fed with sub-divided and graded signals through a switched control unit 27 which divides the normal, swept frequency transmission into separate sub-sweeps of graded amplitudes. The signals from the transmitters 26, after reflection, are received by a single geophone array 28.

Whether during reception or transmission the frequency-sensitive control may be effected by using strings of spaced transducers, as has been described, which is a case in which the frequency-sensitive control action is produced by the addition of signals having a time displacement between them, by using transducers whose directional sensitivity is a function of frequency or by resonating transmitting or receiving transducers.

The present invention is not limited to its application to seismic prospecting, but it may also be of value whenever wave motion is to be transmitted between spaced points, under conditions where the bandwidth is not small relative to the centre frequency. The invention may also be adapted to enhance the value of electrical mixing in many types of seismic work, including the conventional (explosive) method. Thus a multi-trace seismic record which is to be mixed may itself be divided into several records, each of which represents a narrow part (for example, a half octave) of the total frequency bandwidth present in the record. The narrow band records may then be individually mixed, with a high degree of mixing for the low frequency record, a lesser degree for the medium frequency record (or records) and very little mixing for the highest frequency record. Then the several records may be recombined to yield one final record which has been subjected, in effect, to frequency-dependent mixing.

In the implementation of frequency-dependent mixing it is desirable that the division into the several narrow frequency bands should be effected by zero-phase filters. In the Vibroseis system this can very easily be accomplished by correlating the field record against each of several sections of the master sweep signal. With other transmission any suitable or known zero-phase filtering methods may be used; an example is the zero-phase filter which is described in British patent application No. 40,018/61 and in United States application Serial No. 235,622 filed by William E. Lerwill and Nigel A. Anstey on November 6, 1962.

I claim:

1. A method of transmitting and receiving signals utilizing a total signal bandwidth of more than one half octave and employing a transducer array to discriminate between received signals having different apparent velocities across the array, said method comprising the steps of successively transmitting different parts of said total bandwidth signals with each such part containing at least some signals differing in frequency from the signals of the other parts and each of said parts having a bandwidth of less than one octave, changing the effective dimensions of the array between the transmissions of the several parts so that these dimensions are appropriate to the known apparent velocities and the known frequency content of the respective parts, receiving each part at the transducer array, and then combining the signals received from the transmissions of the several parts to yield a combined signal having the intended total bandwidth.

2. The method defined by claim 1 in which the transmitting step is effected by transmitting several parts each having a swept frequency range, said frequency ranges being consecutive and, when taken together, making up a complete swept frequency range equal to said total signal bandwidth.

3. The method defined by claim 1 in which the transmitting step is effected by transmitting a first part having a bandwidth less than that of a second part, said first part being transmitted for a period of time less than the period of transmission of said second part, the ratio between the latter transmitting periods being proportional to the ratio between the bandwidths of said first and second parts.

4. The method defined by claim 2 in which the transmitting step is effected by transmitting a first part having a bandwidth less than that of a second part, said first part being transmitted for a period of time less than the period of transmission of said second part, the ratio between the latter transmitting periods being proportional to the ratio between the bandwidths of said first and second parts.

5. The method defined by claim 1 in which the transmitting step is effected by transmitting parts dividing said total bandwidth into approximately equal frequency subdivisions in terms of octaves, the higher frequency parts being transmitted for longer priods than the lower frequency parts to maintain substantially equal contributions from all frequencies.

6. The method defined by claim 2 in which the transmitting step is effected by transmitting parts dividing said total bandwidth into approximately equal frequency subdivisions in terms of octaves, the higher frequency parts being transmitted for longer periods than the lower frequency parts to maintain substantially equal contributions from all frequencies.

7. The method defined by claim 1 in which the step of changing the effective dimensions of the array is accomplished by providing an array containing a preselected number of transducers and by effectively weighting signals detected by selected ones of said transducers so that each transducer contributes a predetermined portion of the signals received from the transmission of each part, said weighting being changed for the transmission of the different parts.

8. The method defined by claim 7 in which the weighting is achieved by attenuating the signals from selected ones of the transducers.

9. A method of seismic exploration utilizing the generation in the earth's crust of signals having a total signal bandwidth of more than one half octave and also utilizing a transducer array of spaced apart geophones spaced from the generating point to discriminate between received signals having different apparent velocities across the array, said method comprising the steps of successively transmitting different parts of said total bandwidth signals at different times, each of said parts containing at least some low frequency signals differening in frequency from the signals of the other parts and each of said parts having a bandwidth of less than one octave, changing the effective dimensions of the array between the transmissions of the several parts so that these dimensions are appropriate to the known apparent velocities and the known frequency content of the respective parts, receiving each part at the transducer array, and then combining the signals received from the transmissions of the several parts to yield a combined signal.

10. The method defined by claim 9 in which the transmitting step is effected by transmitting several parts each having a swept frequency range, said frequency ranges being consecutive and, when taken together, making up a complete swept frequency range equal to said total signal bandwidth.

11. The method defined by claim 9 in which the transmitting step is effected by transmitting a first part having a bandwidth less than that of a second part, said first part being transmitted for a period of time less than the period of transmission of said second part, the ratio between the latter transmitting periods being proportional to the ratio between the bandwidths of said first and second parts.

12. The method defined by claim 10 in which the transmitting step is effected by transmitting a first part having a bandwidth less than that of a second part, said first part being transmitted for a period of time less than the period of transmission of said second part, the ratio between the latter transmitting periods being proportional to the ratio between the bandwidths of said first and second parts.

13. The method defined by claim 9 in which the transmitting step is effected by transmitting parts dividing said total bandwidth into approximately equal frequency subdivisions in terms of octaves, the higher frequency parts being transmitted for longer periods than the lower frequency parts to maintain substantially equal contributions from all frequencies.

14. The method defined by claim 10 in which the transmitting step is effected by transmitting parts dividing said total bandwidth into approximately equal frequency subdivisions in terms of octaves, the higher frequency parts being transmitted for longer periods than the lower frequency parts to maintain substantially equal contributions from all frequencies.

15. The method defined by claim 9 in which the transmitting step is effected by transmitting a first part having a range from about 20 to 30 cycles per second, a second part having a range from about 30 to 40 cycles per second, a third part having a range of about 40 to 60 cycles per second and a fourth part having a range of about 60 to 80 cycles per second.

16. The method defined by claim 15 in which said transmitting step is accomplished by transmitting each of said third and fourth parts for periods of time longer than the periods of transmission of said first and second parts.

17. The method defined by claim 16 in which each of the first and second parts are transmitted for equal periods of time and in which each of the third and fourth are transmitted for equal periods twice as long as the periods of transmission of the first and second parts.

18. The method defined by claim 9 in which the step of changing the effective dimensions of the array is accomplished by providing an array containing a preselected number of transducers and by effectively weighting signals detected by selected ones of said transducers so that each transducer contributes a predetermined portion of the signals received during the transmission of each part, said weighting being changed as the different parts are transmitted.

19. The method defined by claim 18 in which the weighting is achieved by attenuating the signals from selected ones of the transducers.

20. The method defined by claim 9 in which said receiving step is performed by spacing the geophones along a line at different distances from a datum point and in which the combining step is effected by adding together the outputs of the geophones in proportions determined at least in part by the distances of the geophones from said datum point.

21. The method defined by claim 9 in which the receiving step is performed by orienting the geophones in a plurality of strings of spaced apart geophones, the spacing between the geophones in each string being determined by the frequency content of the part to be detected by that string.

References Cited by the Examiner

UNITED STATES PATENTS

| | | | |
|---|---|---|---|
| 2,167,124 | 7/1939 | Minton | 181 |
| 2,473,469 | 6/1949 | Dahm | 340—15.5 |
| 2,509,651 | 5/1950 | Olson | 181 |
| 2,558,868 | 7/1951 | McCarty | 181 |
| 2,599,064 | 6/1952 | Minton | 340—15.5 |
| 2,623,113 | 12/1952 | Bayhi et al. | 340—15.5 |
| 2,902,107 | 9/1959 | Erath et al. | 340—15.5 |
| 2,906,363 | 9/1959 | Clay | 181 |
| 3,066,754 | 12/1962 | Johnson | 340—15.5 |
| 3,142,815 | 7/1964 | Picou | 340—15.5 |
| 3,182,743 | 5/1965 | McCollum | 340—15.5 |

BENJAMIN A. BORCHELT, *Primary Examiner.*

CHESTER L. JUSTUS, *Examiner.*

R. M. SKOLNIK, *Assistant Examiner.*